Figure 1:
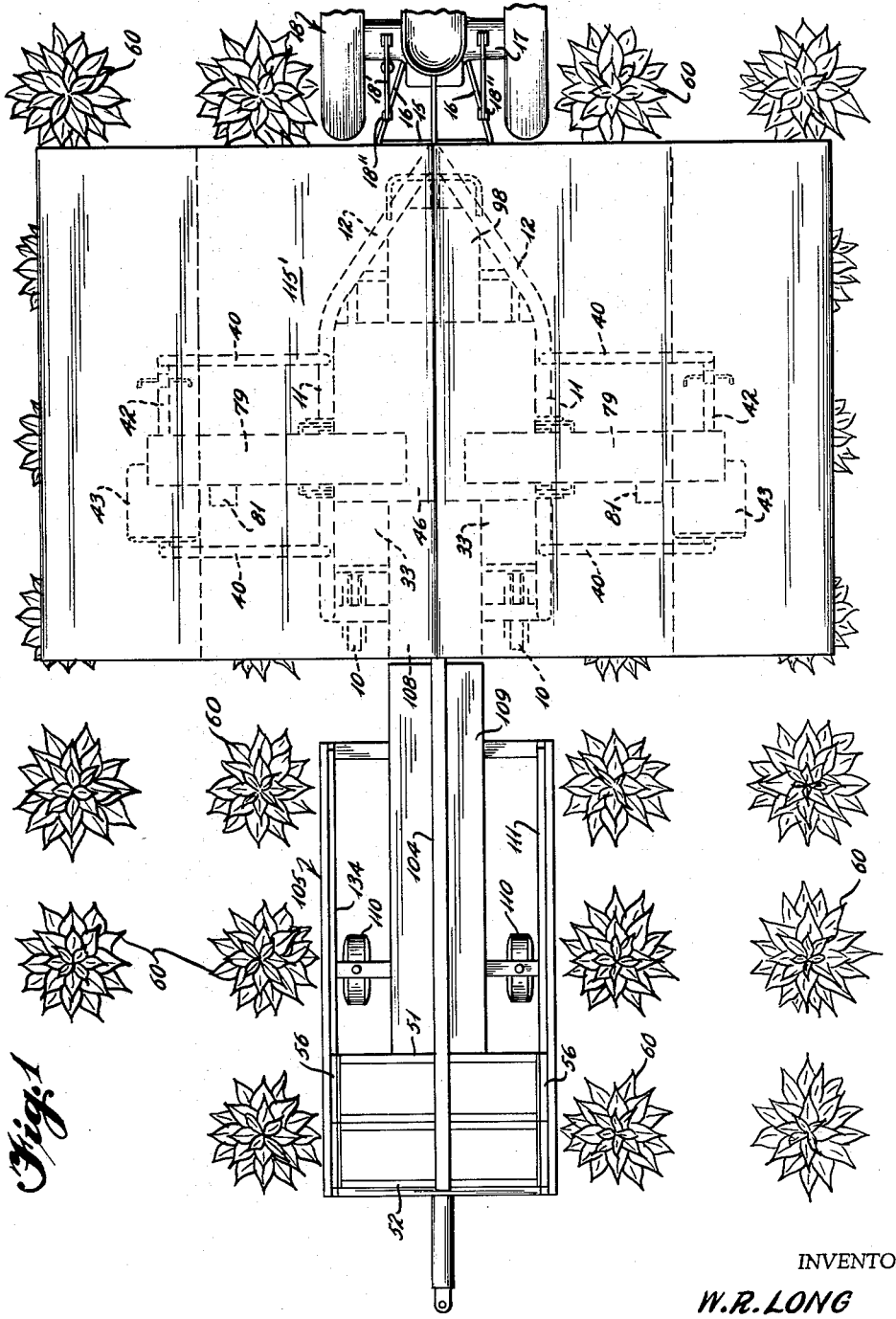

Jan. 18, 1966  W. R. LONG  3,229,831
TOBACCO HARVESTER WITH THE PICKER'S SEAT MOUNTED ADJACENT
LONGITUDINAL AND LATERAL SPACE CONVEYORS
Filed Aug. 16, 1961  10 Sheets-Sheet 1

INVENTOR
W.R. LONG

BY
ATTORNEY

INVENTOR
W.R. LONG

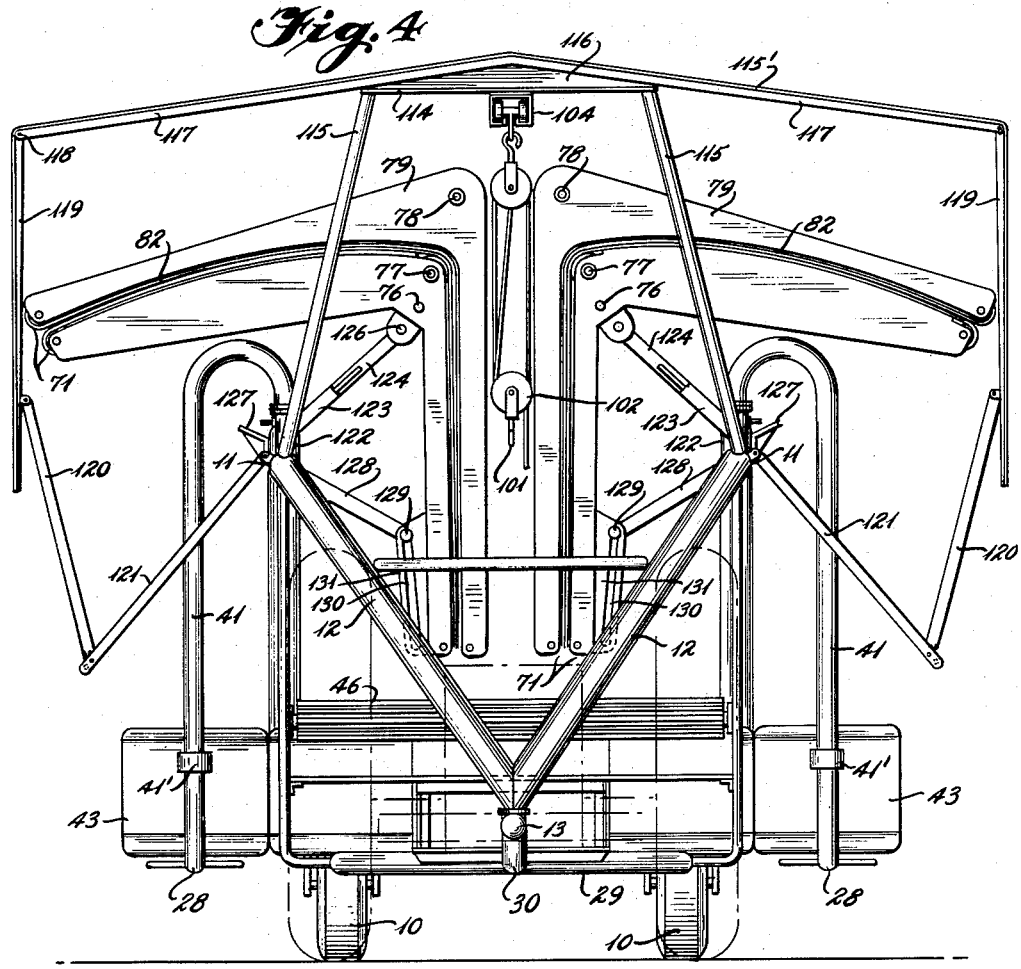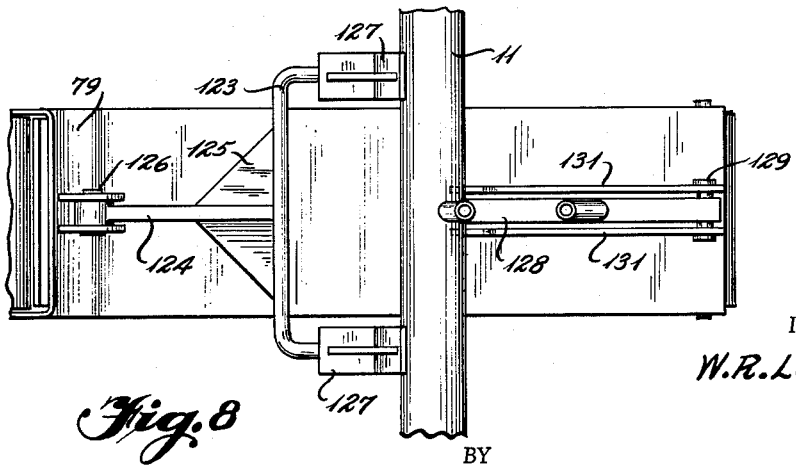

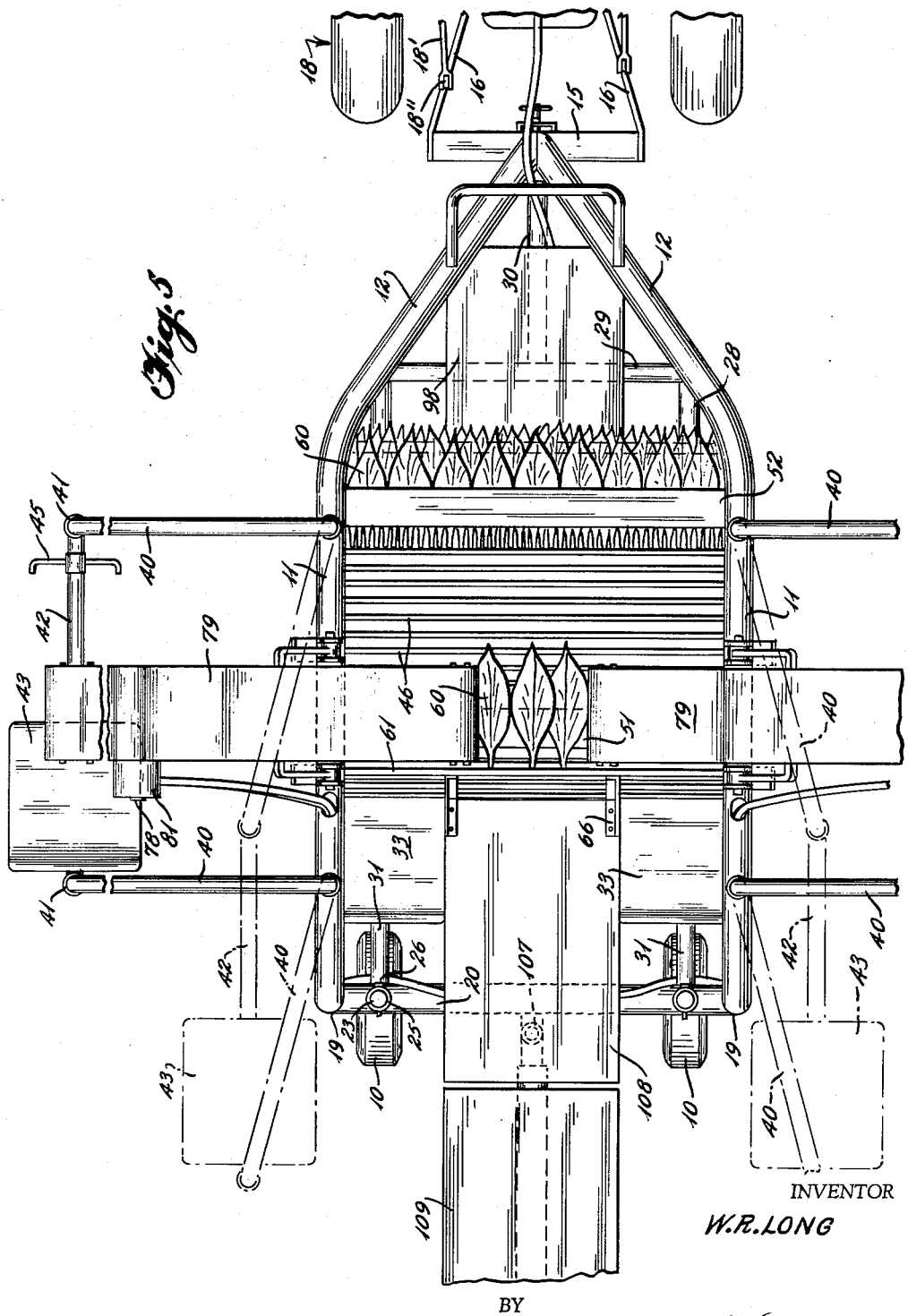

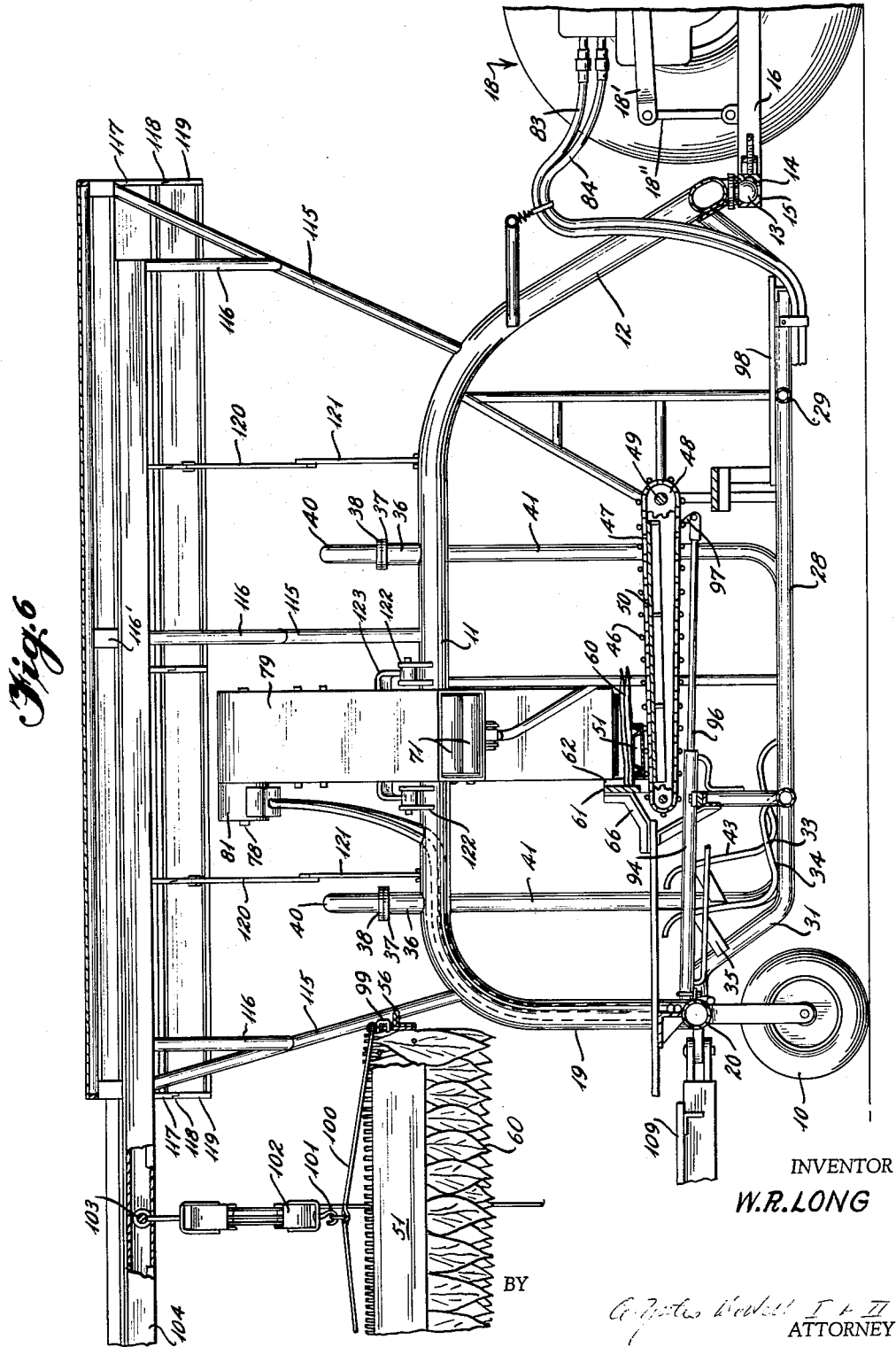

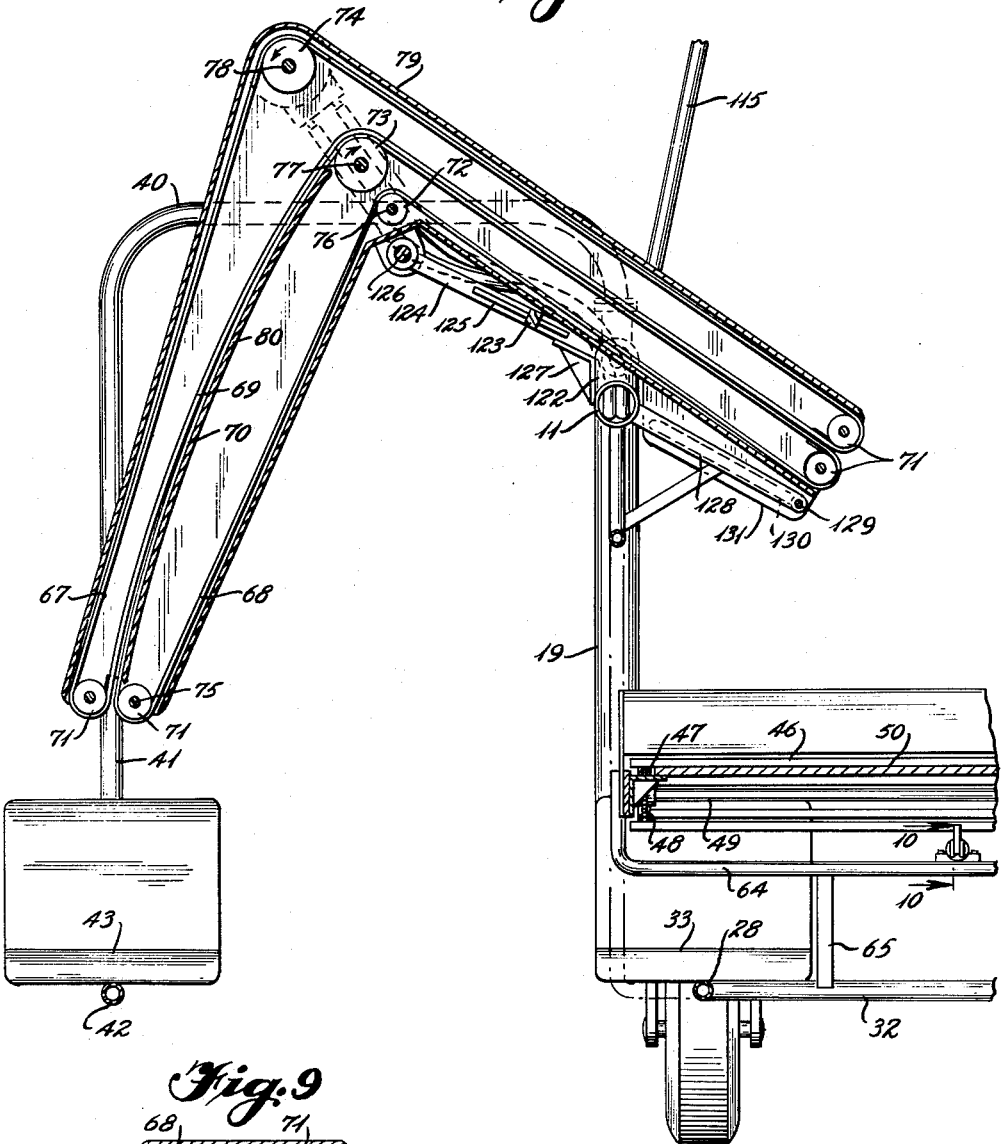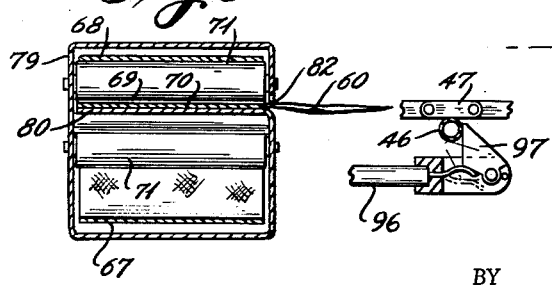

Jan. 18, 1966 W. R. LONG 3,229,831
TOBACCO HARVESTER WITH THE PICKER'S SEAT MOUNTED ADJACENT
LONGITUDINAL AND LATERAL SPACE CONVEYORS
Filed Aug. 16, 1961 10 Sheets-Sheet 8

INVENTOR
W. R. LONG

BY
ATTORNEY

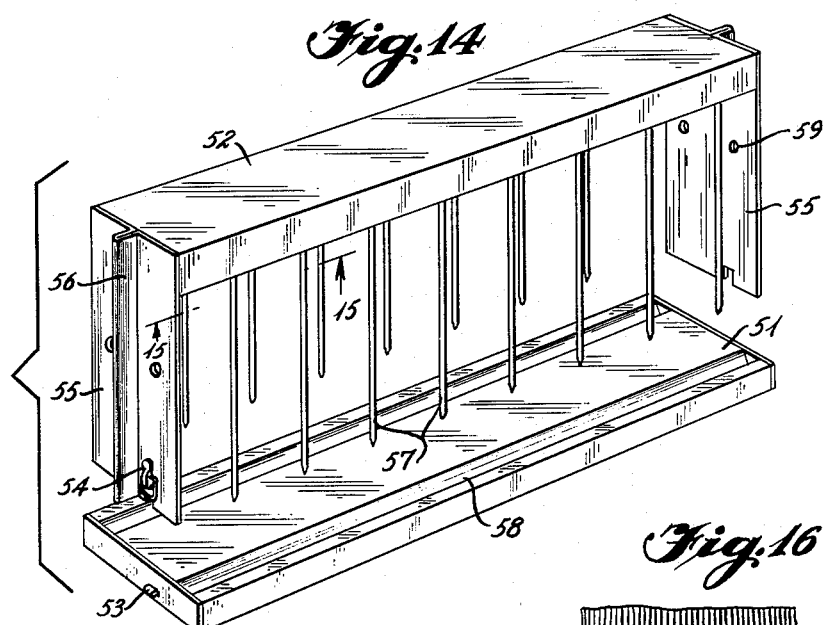
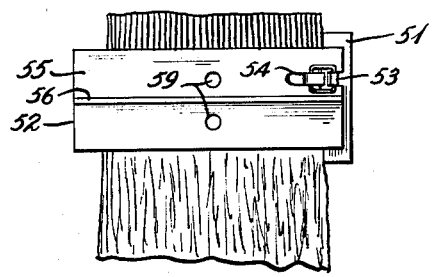
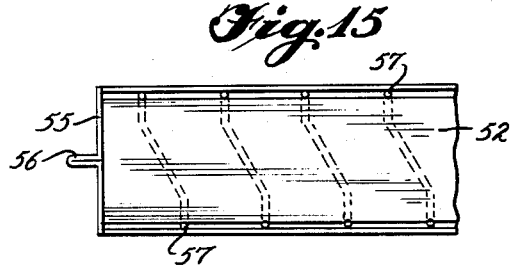
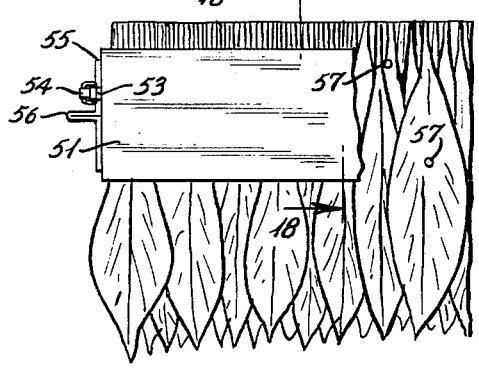
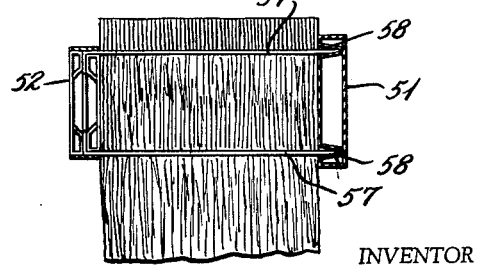

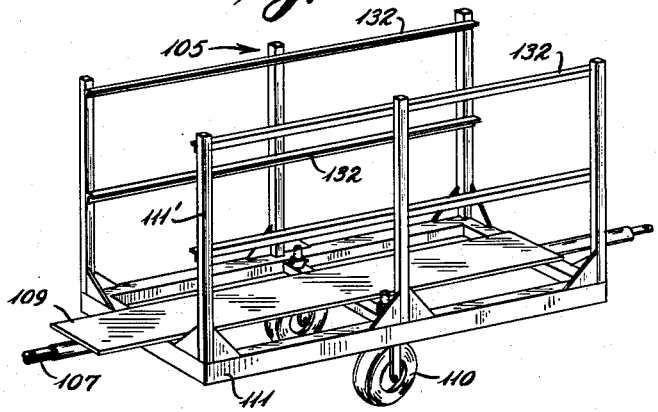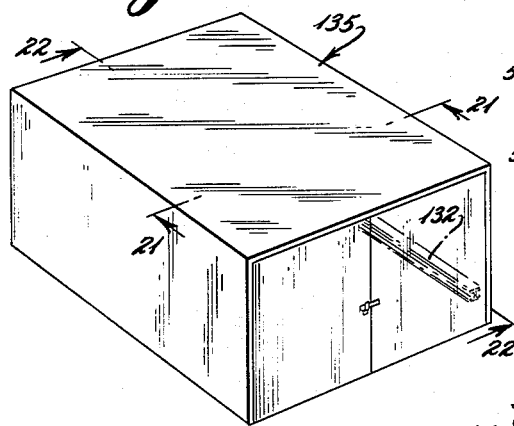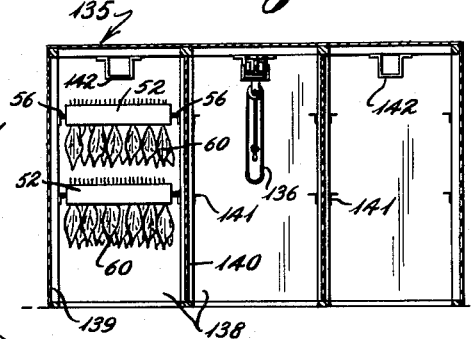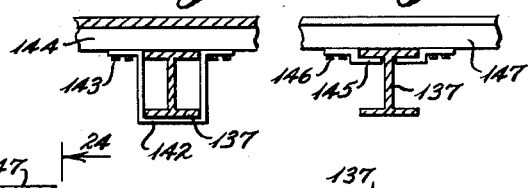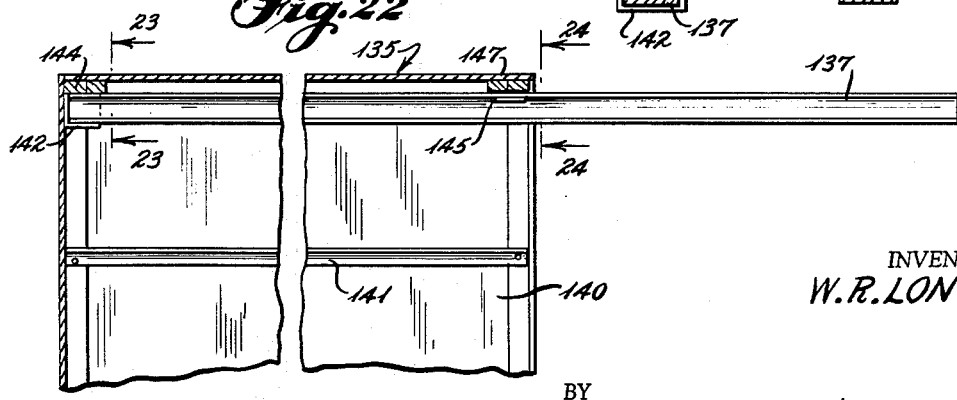

United States Patent Office 3,229,831
Patented Jan. 18, 1966

3,229,831
TOBACCO HARVESTER WITH THE PICKER'S SEAT MOUNTED ADJACENT LONGITUDINAL AND LATERAL SPACE CONVEYORS
William R. Long, Tarboro, N.C., assignor to Long Manufacturing Company, Tarboro, N.C.
Filed Aug. 16, 1961, Ser. No. 131,791
9 Claims. (Cl. 214—83.1)

This invention relates to the harvesting of crops of various kinds including tobacco which usually is cured by being subjected to drying air with or without heat and prior to its being used in the manufacture of tobacco products.

The invention relates particularly to the harvesting of tobacco and to the equipment employed in such harvesting, handling, and treatment of the tobacco with a view to reducing the amount of time, labor, and consequent expense in such operations.

It has been customary for workmen to travel between rows of tobacco and select the ripe leaves or those in their prime, and to place the same in some sort of a container or on some sort of a vehicle for transportation to barns or to other places for curing by flue or otherwise or for the performance of other operations on or in connection with the tobacco. In Patent 2,704,158 a motor driven tobacco harvester was provided on which workmen rode and picked or collected the leaves in their prime or primed the tobacco, placing the leaves as they were removed from the stack of the tobacco on which they were growing between spring pressed rollers attached to a conveyor so that the leaves of tobacco would be carried upwardly and along a horizontal run of adequate length to allow sufficient time to permit removal by a workmen who could then string the tobacco on sticks one at a time and place the filled sticks on the rear of the vehicle. While this was an improvement over prior devices and there was a saving of labor the ultimate was not attained and the cost still was excessive.

It is an object of the invention to improve the manner of harvesting tobacco and to provide a reasonably priced machine which will eliminate unnecessary handling and movement of the tobacco and consequently will be less expensive, less time consuming, and cause less injury to the tobacco.

Another object of the invention is to provide a machine consonant with approved modern technique in the accelerated handling and curing of tobacco in bulk, by which handling of a greater number of leaves is possible as also is the curing of larger quantities of tobacco by means of greater compactness and the forced circulation of heated air, and all with resultant savings.

Another object of the invention is to provide a tobacco harvester which may be a part of or drawn by another vehicle, and which harvester is simple, can be used in a field where every fifth row is omitted so that the machine can travel along such row and with workmen supported at opposite sides in a position to reach and detach leaves of tobacco from two or more rows at each side of the machine simultaneously, and with the tobacco picked by the workmen in the more remote positions from the plants in the more widely separated rows compressed and carried between conveyors with normally contacting parallel runs to a central relatively wide short loading conveyor controlled by a workman nearer the center of the vehicle which workman also removes the leaves of tobacco from plants nearest the center of the machine and deposits them directly upon the lower half of a holder across and resting upon the rear end portion of the central conveyor.

Another object of the invention is to provide a machine of the character indicated having means for handling sticks or holders loaded with tobacco weighing 150 to 250 lbs. and by means of which such tobacco sticks may be loaded and unloaded and disposed with such handling means capable of being extended a substantial distance beyond the machine for facilitating the loading of the tobacco into another vehicle, into and from a barn where curing or other operation is accomplished, or other place.

A further object of the invention is to provide a harvester which can be operated continuously and power for operating the same can be obtained for example from the tractor hydraulic system by the diverting of the oil and using it to drive the conveyor, or on which harvester the harvested product can be deposited with minimum effort one holder after another close to the place from which it was obtained and substantially in the lap of the workman, where it can be uniformly arranged and loaded on sticks by the same workman by which it was gathered and removed by one or more additional workmen, thereby permitting the harvester to be operated in a continuous or uninterrupted manner.

Figure 2:
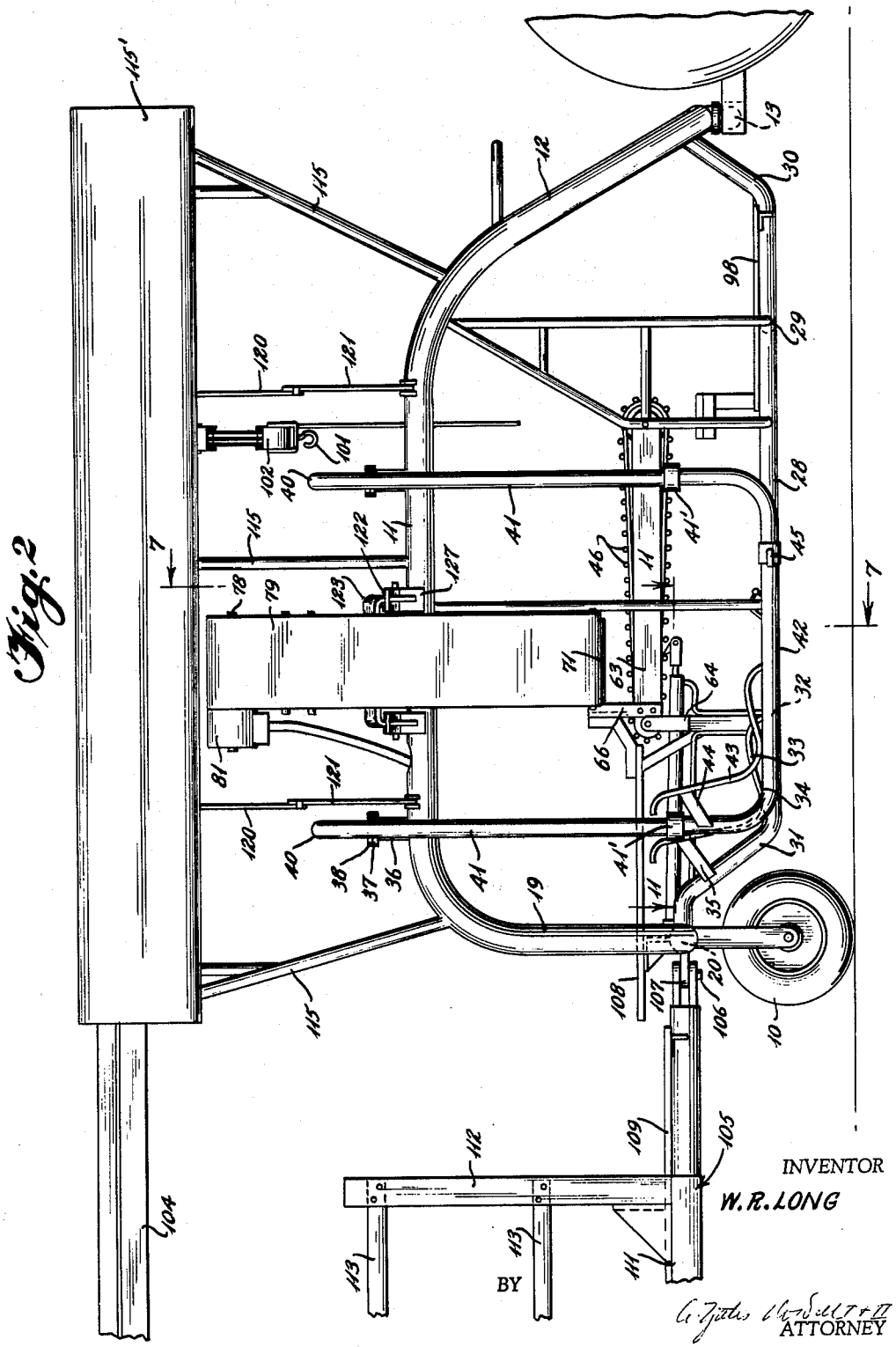
Figure 3:
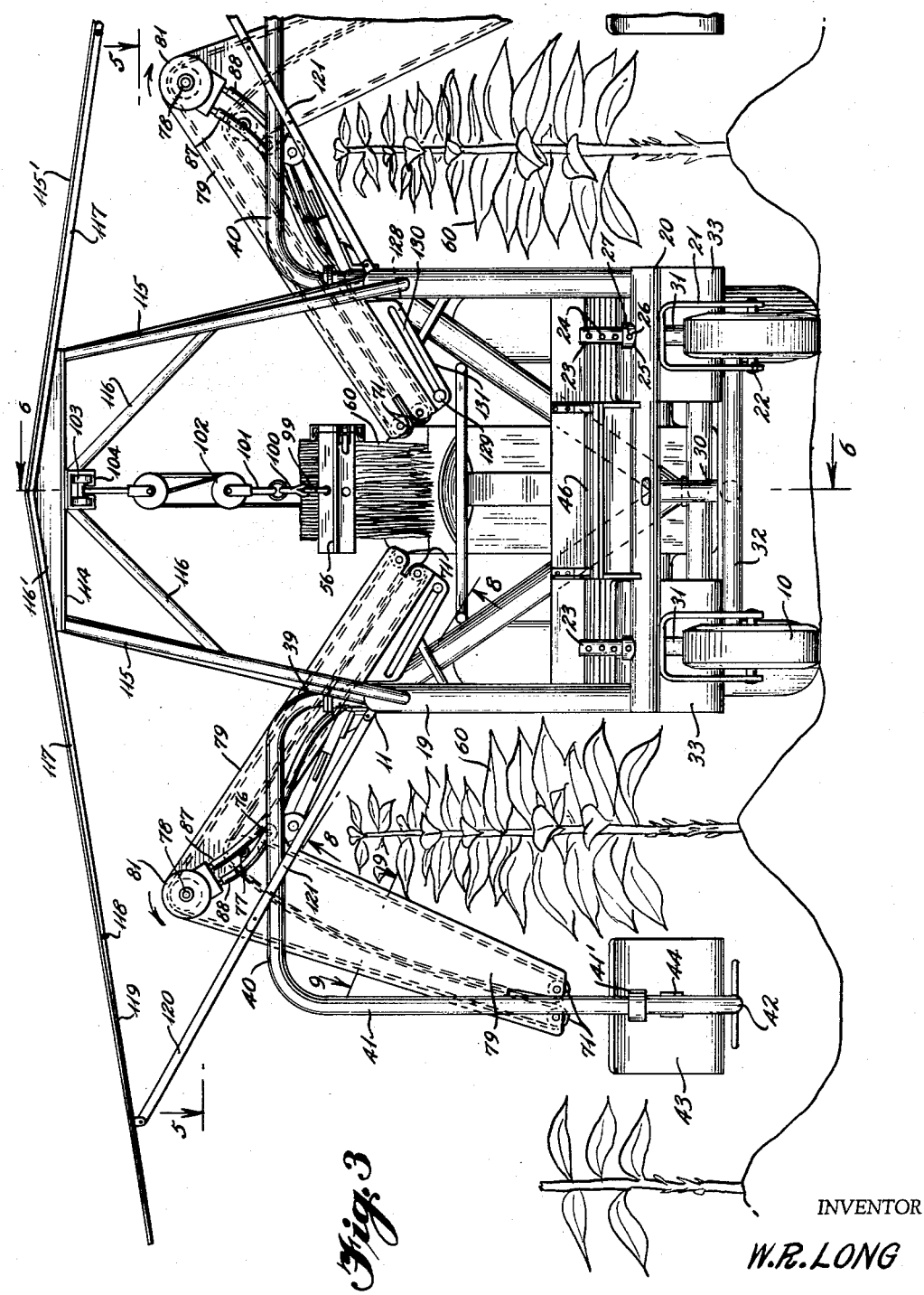
Figure 11:
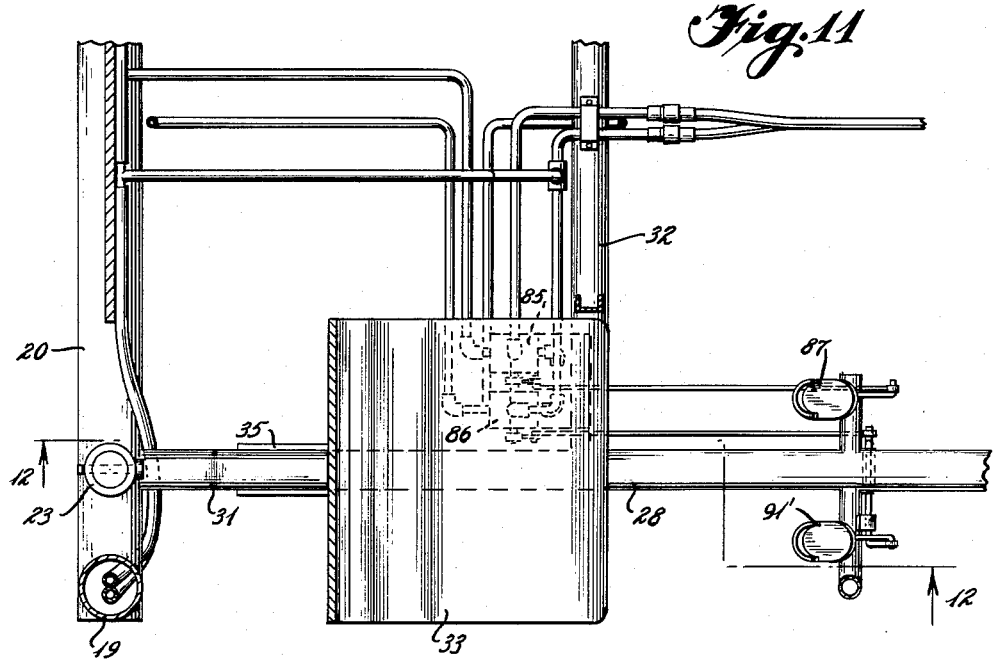
Figure 12:
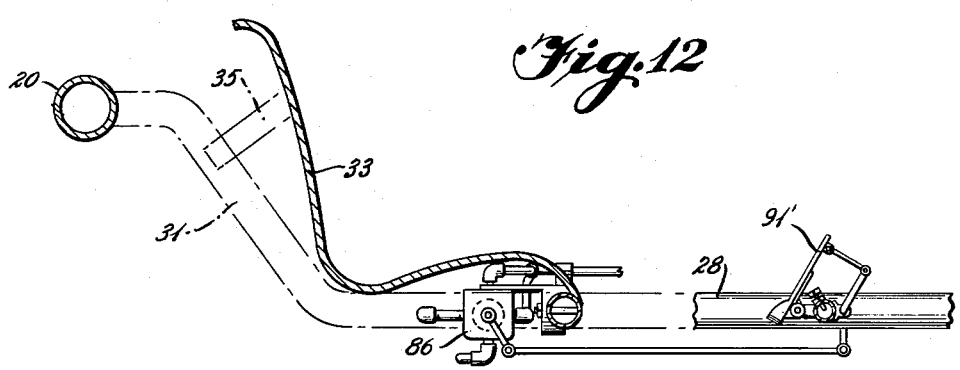
Figure 13:
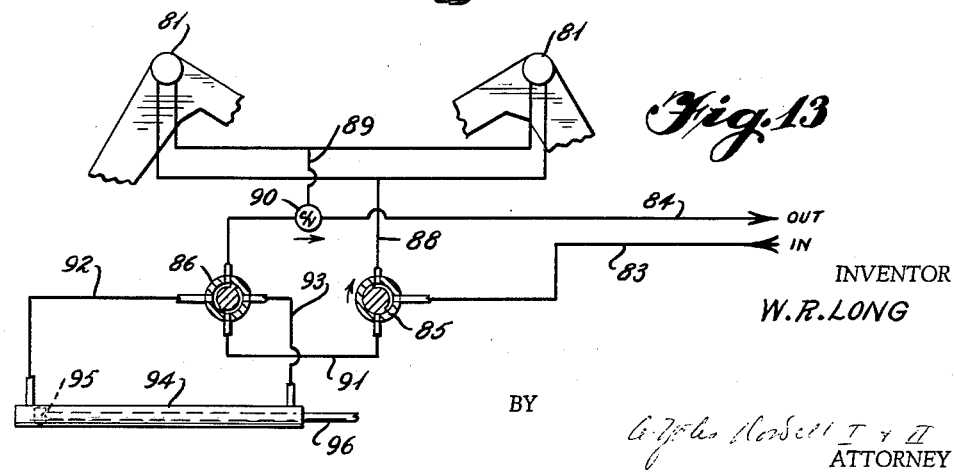

Other objects and advantages of the invention will be apparent from the following description taken in conjunction with the accompanying drawings wherein:

FIG. 1 is a top plan view illustrating one application of the invention in use;

FIG. 2, a side elevation of the invention with parts of the device extended for use;

FIG. 3, a rear elevation illustrating the parts extended;

FIG. 4, a front elevation of the device with parts retracted for travel or storage;

FIG. 5, a cross sectional view along the line 5—5 of FIG. 3;

FIG. 6, a longitudinal sectional view along the line 6—6 of FIG. 3;

FIG. 7, a fragmentary cross sectional view taken along the line 7—7 of FIG. 2;

FIG. 8, a fragmentary elevational view of supporting parts of the conveyor taken along the line 8—8 of FIG. 3;

FIG. 9, a cross sectional view through one of the overhead conveyors taken along the line 9—9 of FIG. 3;

FIG. 10, a fragmentary sectional view along the line 10—10 of FIG. 7 through the operating pawl of the hydraulic drive for driving the chain conveyor;

FIG. 11, a fragmentary transverse sectional view, viewed downwardly along the line 11—11 of FIG. 2 illustrating the control valves and operating means;

FIG. 12, a fragmentary sectional view along the line 12—12 of FIG. 11;

FIG. 13, a schematic diagram of the hydraulic operating system;

FIG. 14, an exploded perspective view of the tobacco holder;

FIG. 15, a fragmentary sectional view along the line 16—16 of FIG. 14;

FIG. 16, an end elevation of the upper and lower tobacco holder locked together with tobacco clamped therebetween;

FIG. 17, a fragmentary bottom plan view illustrating the tobacco in the holder;

FIG. 18, a sectional view taken along the line 18—18 of FIG. 17;

FIG. 19, a perspective of one of the auxiliary trailers;

FIG. 20, greatly reduced perspective of a barn;

FIG. 21, a slightly enlarged vertical transverse section on the line 21—21 of FIG. 20;

FIG. 22, a longitudinal section on the line 22—22 of FIG. 20;

FIG. 23, a fragmentary vertical section on the line 23—23 of the retaining socket at the rear of the barn; and FIG. 24, a fragmentary vertical section on the line 24—24 of FIG. 22 illustrating the mounting of the front support brackets.

Briefly stated, the invention is a vehicle intended to travel along an omitted fifth row of growing tobacco or other harvestable crop and with a seat for workmen close to the vehicle at each side and an additional seat for a workman spaced further from the vehicle at each side, the seats spaced from the vehicle being mounted on a swingable frame so that the seats may be disposed close to the vehicle for transportation and storing, and spaced from the vehicle during the harvesting of tobacco, at which latter time the several seats each will be in a position near a row of the tobacco being harvested, the vehicle being constructed for attachment to a propelling vehicle and having a relatively wide short central conveyor located near the ground, the rear end of which extends substantially into the laps of the workman nearer the center at each side of the machine and with side conveyors extending upwardly and inwardly from the workmen in the outer seats for depositing the tobacco on the rear end of the central conveyor upon the lower half of a holder composed of lower and upper halves or portions between which the tobacco is clamped the lower portion of the holder being adapted to be filled and carried forward on the conveyor prior to the upper portion being applied, and the holder and tobacco are adapted to be picked up by mechanical means such as a block and tackle on a monorail track and by means of which the heavy sticks of tobacco can be readily unloaded from the harvester into a barn or other place, as well as removed from such barn, the invention also contemplating an attached trailer on which the sticks or holders of tobacco can be loaded until filled and then the trailer replaced by an empty trailer to permit continuous operation of the harvester.

The invention is a trailer type vehicle having wheels 10 supporting a frame composed of side members 11 with converging front portions 12 inclined downwardly towards their forward extremities. The converging downwardly inclined portions 12 are provided with a ball 13 by which the vehicle may be coupled as a trailer to a tractor or the like, the ball 13 being received in an adjustable socket 14 on a cross member 15 (FIGS. 5 and 6) supported by the arms 16 pivotally maintained on the rear axle 17 of the tractor 18.

In view of the specific construction including the converging downwardly inclined front portion 12 of the frame 11, the tractor is free to turn sharply and almost at right angles. This particular construction allows the trailer to be coupled close to the tractor so that a minimum turning area is required.

The frame members 11 and depending rear portions 19 thereof are connected at their lower ends by a cross member 20 (FIGS. 2 and 6) and wheels 10 are attached to such cross member by yokes 21 mounted on axle forming shafts 22 (FIG. 3). Each yoke 21 has a centrally located upright bar or shaft 23 with spaced openings 24. The bar 23 is slidably mounted in a sleeve 25 extending through the cross member 20 and the bar or shaft 23 is adapted to be secured in adjusted position by a pin 26 located in an opening 27 in the sleeve and through one of the openings 24 in the bar of shaft 23. This structure permits the height of the cross member 20 and accompanying frame to be adjusted and secured in such adjusted position and at a predetermined height.

In order to maintain the proper height and horizontal position of the device the arms 16 (FIG. 6) are supported from arms 18' of the tractor by means of links 18". This permits the arms 16 to be readily raised and lowered and secured at the desired elevation.

At each side of the trailer in line with the respective wheel 10 (FIGS. 2, 6, 7) is mounted a lower supporting frame including a horizontal portion 28. The front ends of the spaced horizontal portions of the supporting frame are connected by cross member 29 carried by a forwardly and upwardly extending support 30 connected to the converging portions 12 of the frame 11. The rear approaches of the lower supporting frame have upwardly inclined terminal portions 31 fixed to the cross member 20 and the frame may be reinforced additionally by the utilization of one or more cross members 32.

Upon each of the lower horizontal portions 28 is mounted a workman's seat 33, one at each side of the machine and this seat is secured in place by welding 34 or by other desired means. A back brace 35 is welded or otherwise secured to the rear terminal portion 31 of the lower frame member 28. This permits the workmen to be carried in close proximity to the stacks of tobacco from which the leaves are to be harvested.

The frame members 11 are spaced in a manner to permit them to pass between two rows of tobacco, the intermediate row of which is omitted, and in order to provide for the carrying of an adidtional workman at each side of the machine and forwardly of the center of the machine an auxiliary frame is provided. In order to mount this auxiliary frame, the side members 11 have upright posts 36 with top flanges 37 which form a pivotal support or bearing for engaging flanges 38 on the downwardly turned extremity 39 of a horizontal member 40. The member 40 has a depending longer arm 41 to which is attached by means of a swivel coupling 41', the rear upturned end of the horizontal bar 42 on which is welded or otherwise secured a seat 43, one at each side of the machine with a back brace 44 welded or otherwise secured to the rear upturned portion of the bar 42. The lower horizontal portion has a foot rest 45 adjustably mounted on its forward portion.

From the construction just described it will be apparent that the remote seats 43 are mounted on a horizontal bar or support 42 carried in the outer extremities of a pair of spaced outwardly extending swingable arms 40 of substantially equal length so that when it is desired the remote seats at opposite sides of the machine by reason of the swivels 41' can be disposed close to the side of the vehicle as illustrated in full lines in FIG. 4 and in dotted lines in FIG. 5, or they can be swung to extended position as illustrated in FIG. 3 and the upper portion of FIG. 5 and remain in parallelism with the vehicle longitudinal axis regardless of their adjustment. When the machine is in full operation and the seats 43 are in extended position the workmen are so positioned that they are conveniently close to the tobacco in the rows so that they may easily prime or select and remove the ripened leaves of tobacco.

The workmen at each side and near the center of the machine or in seats 33 have conveniently disposed in their laps a relatively wide short conveyor, having a width substantially that of the vehicle frame as shown in FIG. 4, and composed of transverse rods 46 carried by chains 47 extending about sprockets 48 on shafts 49. The transverse rods 46 rest upon a plate or table 50 designed to support the substantial weight of tobacco and a workman when the workmen on the seats 33 gather the tobacco, it being only necessary to place the tobacco on the conveyor on the lower half 51 of a holder which extends across the conveyor from one side to the other. When a sufficient amount of tobacco is received on the lower half of the holder, the top run of the conveyor is moved forward and a cooperating top half of the holder 52 (FIG. 14) is applied for securing the lower and upper members of the holder together with the tobacco therebetween. The lower member of the holder has latching lug 53 engageable by a spring latch 54 mounted on the opposite depending end members 55 attached to the upper member 52, such end members each having a central supporting reinforcing rib 56 which provides a guide for the mounting of the holders on the rack of auxiliary trailer and within a barn. The upper member 52 of the holder is provided with spaced depending spikes or projections 57 and is U-shaped with its connecting end portions attached to the member 52 and their free ends depending so they will readily penetrate the tobacco leaves on the lower member 51, the member 51 having a longitudinal recess or channel 58 into which the ends of the spikes or projections are received. In order that the tobacco may be properly compressed the end members 55 are provided with openings 59 for receiving a hanger for facilitating the handling of the holder.

To insure proper alignment of the stem ends of the tobacco leaves 60 a backing plate 61 (FIG. 6) is provided carried by brackets 62 mounted on side plates 63 which also support the shaft 49 of the central conveyor. The side plates and shaft at the rear end of the central conveyor are mounted on a yoke 64 which fits close to the underside of the conveyor, the yoke being supported by a pair of uprights 65 secured to the cross member 32. Added supports 66 may be provided to additionally support the backing or alignment plate 61.

The workman in the seat 33 at each side of the central conveyor occupies about one-fourth the width of the conveyor so that the two workmen fill about half of the length of the holder 51, the tobacco for filling the central portion of the holder being supplied by the conveyors from the more remote workmen at each side of the machine. In order to convey tobacco from such remote workmen a transverse conveyor of vertically inverted V-shape is provided at each side of the machine each having an elevating portion and a second portion for transmitting tobacco transversely of the machine the two being angularly related to provide clearance over a row of growing tobacco plants closely adjacent the side of the machine as indicated in FIG. 3.

Each transverse conveyor comprises a pair of conveyor belts 67 and 68 (FIG. 7) having parallel runs 69 and 70, the conveyor belts being carried on spaced parallel pulleys 71 at the inlet and discharge ends of the conveyors. The intermediate portion of the underlying conveyor 68 is supported by lower and upper rollers 72 and 73, and the intermediate portion of the overlying conveyor 69 is supported by and in contact with the roller 74 by which it is driven. The overlying conveyor rests upon and drives the underlying conveyor 70 as it extends over the roller 73.

The rollers 71, 72, 73, and 74 are mounted on shafts 75, 76, 77, and 78 journalled in the parallel sides of a housing 79 and a supporting plate 80 is disposed beneath the runs 69 and 70 of the conveyor belt. The shaft 78 is driven by a hydraulic motor 81 as will be later explained. The housing 79 is provided with an opening 82 along one side and along the support 80 to accommodate the tobacco leaves 60 of different lengths.

Tobacco leaves harvested and inserted by the workmen into the ends of the conveyors travel first upwardly during which time they are flattened until they are conveyed to the discharge ends of the conveyors whereupon such leaves are discharged onto the holder 51 resting on the rear end portion of the central conveyor. Due to the fact that the conveyor belts 67 and 68 have parallel runs and the tobacco carried between such conveyor belts is flattened the handling of the tobacco after it is discharged from the conveyors will require minimum effort.

The tobacco leaves 60 discharge onto the holder 51 from the lateral conveyors will be discharged substantially centrally of the same and will be arranged by the workmen transversely on the holder with the stems against the backing plate resulting in a more or less uniform distribution along the holder and which can be readily accomplished by the two workmen over whose laps the conveyor is disposed. When the holder is filled the conveyor can be advanced and another holder can be placed in position to be filled.

Power for operating the three conveyors may be supplied from any desired source as, for example, from the hydraulic system of a conventional tractor 18 through hose 83 and 84 subject to control valves 85 and 86, noting FIGS. 11–13. Upon the operation of the control valve 85 in one direction by means of the first foot pedal 87 hydraulic fluid from the line 83 may be supplied through line 88 to the motors 81 the return from which may be through line 89 and a check valve 90 and though the return line 84.

On the operation of the foot control 87 in the opposite direction the valve 85 will be moved to permit fluid from the line 83 to pass into the line 91 and to the control valve 86. Valve 86 is then actuated by movement of foot pedal 91' in either of two directions to direct the flow of fluid to either end of the cylinder 94. By this means hydraulic fluid may be supplied through the lines 92 and 93 to opposite ends of the cylinder 94 to move a piston 95 lengthwise in the cylinder and with the rod 96 attached to the pivoted pawl 97 reciprocable beneath the conveyor, noting FIG. 6, the pawl being attached to retractingly engage the cross bars 46 and advance the conveyor.

It will be apparent from the consideration of FIG. 13 that when hydraulic fluid is supplied through the line 91 so that the central conveyor can be advanced by the operation of the foot control 91' that the supply of such hydraulic fluid through the line 88 to the motors 81 is interrupted so that the lateral conveyors driven by the motors 81 will be immobile during the advancing of the central conveyor.

As soon as the tobacco holder on the rear end of the central conveyor has been filled the conveyor can be advanced and an empty holder 51 can be placed on the rear of the central conveyor by a workman on a forward platform 98 and such workman may apply a top or cap 52 to the filled lower portion of the holder 51 and may attach a pair of hooks 99 of a sling 100 to a hook 101 of a block and tackle conveyor 102 supported on a pair of rollers 103 within a monorail 104. The monorail is located on the harvester trailer and extends substantially the length of and rearwardly beyond the end of the trailer to a position to overlie an auxiliary trailer 105 fastened by a coupling pin 106 and a lug 107 to the first or primary trailer on which the holders with tobacco can be deposited by a workman stepping from the forward platform onto the central conveyor and over the unfilled or partially filled holder on the rear of the conveyor onto a rear platform or catwalk 108.

The auxiliary trailer 105 is provided with a platform or catwalk 109 onto which during the removal of a filled holder of tobacco from the central conveyor a workman can walk onto the auxiliary trailer. The auxiliary trailer is mounted on wheels 110 and has a frame 111 on which a series of upright posts 112 are mounted such posts having horizontal rails or runners 113 at each side of the vehicle on which the reinforcing flange 56 at each end of the tobacco holder may be placed in piling the holders of tobacco onto such auxiliary trailer.

In order to support the monorail 104, a series of cross members 114 are supported by a series of uprights 115 at each side of the machine mounted on the side members 11 and the end portions 19 and 12 thereof. Angular braces 116 are provided for reinforcement. In order to provide a roof or canopy 115' for the workmen, top central supports 116' are provided to which are attached at each side a series of ribs 117 having pivots 118 to which are hinged extensions 119 connected by pivotally connected links 120 and 121 to the posts 11.

In order to support the lateral conveyor housing 79 in each of which the conveyors 67 and 68 are contained, spaced brackets 122 are welded or otherwise secured and to the side members 11 and to two of such brackets are pivoted the opposite ends of a yoke 123. To the central portion of the yoke 123 is fixed a stanchion or leg 124 with a pair of gussets 125 between the yoke and such leg. The end of the leg 124 is connected by a pivot 126 to the underside of the housing 79. Thus, the conveyor 79 is outwardly swingable about the brackets 122 and also pivotal about its pivot 126 on yoke leg 124. In the collapsed position of the lateral conveyors, the parts will be disposed in the position shown in FIG. 4 and when in extended position as illustrated in FIG. 7, the conveyor housing being constructed to pivot around the yoke 123 and leg member 124 until the sides of the yoke rest upon a stop or bracket 127 fastened to the exterior of the bracket 122 on the frame 11.

In order to provide a stop for each conveyor in its extended and retracted positions, a bracket 128 is provided fastened at its outer end to the side member 11 and having a pivotal connection 129 on its remote end which reciprocates in a slot 130 in a pair of side plates 131 fixed to the underside of the housing 79. When the conveyor is in extended position it rests against the stop 127 and the connection 129 prevents rotation of the conveyor housing, and when in its collapsed position the pivot 129 provides a support and a stop for the conveyor housing and contained conveyor.

Tobacco harvested in the field is compressed into a compact mass within the upper and lower portions of the holders and such holders filled with tobacco are moved from the position in which they are filled to a trailing vehicle 105 having posts 112 on which are supported parallel side rails 113 which form a rack for said holders. It is intended that several of the trailing vehicles be employed one at a time connected to the harvester to insure continuous operation of the latter.

From the rack forming side rails 113 on the auxiliary trailer 105 the sticks or holders of tobacco can be moved into a barn 135 by means of a block and tackle 136 supported by an I-beam or monorail 137 in each of multiple compartments 138 defined by outer walls 139 and partitions 140, side rails 141 being mounted in parallel relation on the opposite walls which form the sides of each compartment of the barn so that the tobacco can be placed in such compartment until the latter is either partially or completely filled, whereupon the drying or curing of the tobacco can be accomplished by subjecting the compact mass of tobacco to the drying effect of the air subject to forced circulation thereof. In the filling and removing of the compartments of the barn, a single monorail 137 may be employed, the barn being provided with a socket 142 at its rear in which the rear end of the monorail may be removably received. The socket 142 is secured by fasteners 143 to a rear rafter or frame member 144 on the barn. The monorail 137 preferably is supported at its forward end by means of brackets 145 secured by fasteners 146 to a front frame member or rafter 147.

It will be apparent from the foregoing that equipment is provided appropriately usable in the harvesting and handling of tobacco, and by which equipment harvesting can be done continuously with minimum effort time and expense as well as the minimum handling and travel of the tobacco with resultant minimum injury thereto.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tobacco harvester comprising a trailer type vehicle having a body frame, a first pair of seats for workmen mounted in said body frame relatively near the ground for minimum effort in detaching leaves of tobacco from growing plants, a relatively wide longitudinally extending central conveyor disposed substantially horizontally and extending substantially the width of said body frame with the rear end of the same near said seats for the workmen so that the bodies of the workmen will extend above such conveyor and the workmen's legs will extend forwardly beneath such conveyor, outer seats for additional workmen spaced laterally and outwardly of the vehicle body frame from each of the first seats, depending means supporting said outer seats at substantially the elevation of the adjacent seats, to form with said first pair of seats two pairs of spaced seats, said depending support means including at the upper ends thereof outwardly extending portions integral therewith and pivotally mounted on said body frame for adjustably positioning said seats outwardly relative to said body frame, said depending means at the lower ends thereof including means swivelly connected thereto for mounting said outer seats thereon, a pair of adjustably mounted lateral conveyors each mounted in overlying relation to each pair of spaced seats for movement of tobacco transversely of the vehicle between a location conveniently near said outer seats for the workmen to the rear of the central conveyor for conveying tobacco from said pair of conveyors onto said central conveyor, and said pair of laterally extending conveyors each being mounted on soid body frame for bodily swingable and pivotal movement in a single plane transversely of the vehicle.

2. The structure of claim 1 wherein said depending support means each comprises a pair of said outwardly extending arm portions longitudinally spaced from each other with vertically depending leg portions integral therewith, said means connected to the lower end of said depending means each comprising a generally horizontally extending arm portion swivelly connected to said vertically depending leg portions and including one of said outer seats thereon, said pivotal mounting of said depending means providing for the disposition of said outer seats close to or spaced from the sides of the vehicle whereby the overall width of the machine can be varied, and said laterally extending conveyors being of inverted V-shape to provide clearance over growing tobacco plants located adjacent said vehicle.

3. A tobacco harvester comprising a vehicle having a seat for a workman positioned near the ground for requiring minimum effort in the detaching of leaves of tobacco from growing plants, a generally horizontally mounted motor driven tobacco receiving conveyor stationarily mounted on said vehicle and longitudinally thereof with the rear end of said conveyor located relative to said seat for the workman so that the legs of a workman on said seat will extend forwardly beneath the conveyor and the arms of the workman will be disposed at an elevation slightly above the rear end of the conveyor, whereby in the harvesting of the tobacco leaves they can be placed forwardly on the rear end of said conveyor with minimum motion, a second motor-driven angular conveyor means extending transversely of the vehicle for conveying picked tobacco leaves laterally from outboard thereof and having an end overlying said horizontally mounted stationary conveyor for depositing the tobacco leaves thereon, and control means adjacent said seat for selective control of both said conveyors.

4. A harvester for tobacco leaves or the like comprising a vehicle having a body frame structure,
  seats mounted near the ground on said body frame structure close to the ground for a workman for convenient harvesting of the leaves of ripe tobacco or the like,
  a first conveyor pivotally and swingably mounted in a vertical plane extending transversely outboard of said vehicle and having an end positionable adjacent one of said seats, motor means for driving said conveyor,
  a generally horizontal second conveyor receiving tobacco leaves from said first conveyor and including a driving motor therefor fixedly mounted on and extending longitudinally of a portion of said vehicle with the rear end of the conveyor located substantially in the lap of a workman in the other of said seats so that a workman in said other seat can detach the tobacco from the tobacco plants and place the same directly on said second conveyor until a predetermined quantity of tobacco is accumulated,
  motor control means for selectively actuating both said conveyors subject to the control of the workman in said other seat whereby the accumulated tobacco on said second conveyor can be moved to make way for additional tobacco to be accumulated thereon.

5. A relatively compact tobacco harvester comprising a vehicle including a frame,
  a forwardly extending generally horizontal conveyor mounted on said vehicle frame,
  seats for workmen on said frame at the rear end of said conveyor and near the ground whereby workmen may detach tobacco leaves and place them directly on the rear end portion of said conveyor,
  a plurality of supports vertically pivoted on said frame on vertical pivots and extending outwardly of said vehicle on opposite sides thereof above the normal height at which tobacco grows,
  seats carried by said vertically pivoted supports for workmen picking tobacco leaves outwardly of the vehicle,
  laterally extending means on said vehicle for receiving and conveying the picked tobacco leaves to said horizontal conveyor,
  said vertical pivots providing the sole means of connection between said vertically pivoted supports and said frame,
  said vertically pivoted supports each comprising a plurality of depending and parallel members including swivelled means interconnected therebetween,
  said swivelled interconnecting means having said second-mentioned seats for workmen carried thereby, and
  said outwardly extending supports including said depending members and seat-carrying means swivelled therebetween being adjustably movable to a position close to or remote from the sides of the vehicle wherein said seats remain directionally fixed regardless of the position to which they are adjusted.

6. A tobacco harvester comprising a vehicle having a pair of adjustable seat-supporting frames, means for mounting said frames for angular movement in a horizontal plane, said frames extending laterally outwardly therefrom at an elevation to clear the tips of growing tobacco plants and including depending portions extending close to the ground,
  a seat carried by each of said depending portions and adjustably spaced outwardly of said vehicle,
  a tobacco receiving conveyor carried on the vehicle in laterally spaced relation to each of said seats,
  and laterally extending conveyors of non-linear shape to clear the tops of growing tobacco plants close to said vehicle and mounted to extend from a position near each of the seats and upwardly of and adjacent said seat-supporting frames to a position over said receiving conveyor for transmitting thereto the tobacco picked and placed on said laterally extending conveyors by workmen in said seats.

7. A tobacco harvester comprising a vehicle having a body structure,
  a pair of vehicle frame members on said body structure and located to support a seat at each side of the vehicle near the ground for seating workmen,
  a generally horizontal longitudinally movable support mounted on and intermediate the length of the vehicle on which leaves of tobacco are adapted to be received,
  a pair of depending transversely extending frames pivotally mounted at their upper ends, one at each side of the vehicle and supporting additional seats adjustably spaced outwardly from the sides of said body structure,
  each of said pivoted transversely extending frames including spaced depending portions including swivels and a lower portion interconnecting said swivels,
  said additional seats being mounted on said lower portion,
  and laterally extending conveyors of inverted V-shape carried by said vehicle body structure for transmitting leaves from said workmen in said additional seats to said generally horizontal movable support.

8. A tobacco harvester for handling tobacco leaves during harvest thereof from rows of growing tobacco plants comprising a vehicle having a body frame structure,
  a relatively wide and planar power-driven longitudinally extending conveyor mounted centrally of the vehicle,
  a seat on said body frame structure for a workman near each rear side edge of said conveyor,
  said conveyor being adapted to receive a work holder thereon for disposition across the rear end thereof and onto which tobacco removed from the growing plants can be easily placed by said workmen, and
  a pair of angular power-driven conveyors extending laterally of the vehicle disposed for transverse tiltable and pivotal co-planar movement about axes positionable outwardly from the sides of the vehicle and over such work holder member on the rear of the central conveyor, whereby tobacco leaves are conveyed thereto by said lateral conveyors placed thereon by workmen outboard the body frame structure and adapted to be placed in the work holder to be combined with the tobacco previously gathered by said workmen.

9. A relatively compact tobacco harvester comprising:
  a vehicle having a body frame,
  a longitudinally extending stationarily mounted horizontal conveyor of substantially the width of said body frame centrally mounted on said vehicle for receiving and conveying the tobacco leaves lengthwise of said vehicle,
  a pivotally mounted inverted V-shaped conveyor means extending transversely of said vehicle for conveying tobacco leaves from outboard thereof and having an inner end overlying said horizontal conveyor,
  power controlling means to selectively actuate said conveyors,
  seats for workmen adjacent each of said conveyors and positioned near the ground whereby workmen on said seats may detach leaves of tobacco from growing plants and place them directly on said conveyors,
  means adjacent one of said seats for actuating said power controlling means,
  said horizontal conveyor being adapted to have positioned thereon a holder of a length substantially coextensive to the conveyor width for receiving and securing tobacco leaves therein,
  said body frame including an upper portion extending above said horizontal conveyor, and means carried by said upper extended body portion adapted for lifting and transporting the holders relative to said horizontal conveyor and said vehicle.

References Cited by the Examiner

UNITED STATES PATENTS

| | | | |
|---|---|---|---|
| 1,504,846 | 8/1924 | Tarkington | 214—83.1 |
| 1,522,489 | 1/1925 | Bolen et al. | 294—5.5 |
| 1,858,699 | 5/1932 | Bayley | 119—16 |
| 2,008,637 | 7/1935 | Burrus et al. | 119—16 |
| 2,186,848 | 1/1940 | Uhlir | 280—408 |
| 2,306,231 | 12/1942 | Smith et al. | 280—48 |
| 2,524,181 | 10/1950 | Sivertson | 214—83.1 X |
| 2,647,525 | 8/1953 | Duda et al. | 53—391 |
| 2,699,877 | 1/1955 | Huston | 214—83.26 |
| 2,704,158 | 3/1955 | Long | 214—5.5 |
| 2,708,441 | 5/1955 | Viglione | 131—140 |
| 2,732,961 | 1/1956 | Ervin | 214—83.36 |
| 2,788,141 | 4/1957 | Hendrix | 214—83.1 |
| 2,797,822 | 7/1957 | Shaver | 214—5.5 |
| 2,797,827 | 7/1957 | Mish | 214—5.5 X |
| 2,798,623 | 7/1957 | Girardi | 214—83.1 |
| 2,808,283 | 10/1957 | Vickers | 294—5.5 |
| 2,833,100 | 5/1958 | Correia | 214—83.1 X |
| 2,861,703 | 11/1958 | Imazimi | 214—83.1 |
| 2,933,206 | 4/1960 | Alphin | 214—5.5 |
| 2,940,615 | 6/1960 | Long et al. | 214—5.5 |
| 3,024,792 | 3/1962 | Touton | 131—140 |
| 3,034,664 | 5/1962 | Davis | 214—5.5 |
| 3,105,713 | 10/1963 | Hassler | 294—5.5 |
| 3,107,018 | 10/1963 | Mish | 214—83.1 |

GERALD M. FORLENZA, *Primary Examiner.*

HUGO O. SCHULZ, MORRIS TEMIN, *Examiners.*